(12) United States Patent
Weckbecker et al.

(10) Patent No.: US 9,188,155 B2
(45) Date of Patent: Nov. 17, 2015

(54) ROTARY CONNECTION FOR A WORK MACHINE

(71) Applicant: Terex Cranes Germany GmbH, Zweibrücken (DE)

(72) Inventors: Alfons Weckbecker, Zweibrücken (DE); Ralf Pein, Saarbrücken (DE); Volker Noll, Zweibrücken (DE); Frank Schnittker, Würzburg (DE)

(73) Assignee: TEREX CRANES GERMANY GMBH, Zweibrücken (DE)

( * ) Notice: Subject to any disclaimer, the term of this patent is extended or adjusted under 35 U.S.C. 154(b) by 0 days.

(21) Appl. No.: 14/348,701

(22) PCT Filed: Sep. 27, 2012

(86) PCT No.: PCT/EP2012/069030
§ 371 (c)(1),
(2) Date: Mar. 31, 2014

(87) PCT Pub. No.: WO2013/045525
PCT Pub. Date: Apr. 4, 2013

(65) Prior Publication Data
US 2014/0334752 A1    Nov. 13, 2014

(30) Foreign Application Priority Data
Sep. 30, 2011    (DE) .......................... 10 2011 083 824

(51) Int. Cl.
*F16C 19/38*    (2006.01)
*F16C 21/00*    (2006.01)
(Continued)

(52) U.S. Cl.
CPC ................. *F16C 21/00* (2013.01); *B66C 23/84* (2013.01); *F16C 19/30* (2013.01); *F16C 19/381* (2013.01); *F16C 19/545* (2013.01); *F16C 17/04* (2013.01); *F16C 17/26* (2013.01); *F16C 2300/14* (2013.01)

(58) Field of Classification Search
CPC .... F16C 17/107; F16C 19/188; F16C 19/381; F16C 19/49; F16C 17/26; F16C 19/545
USPC .................................................... 384/452–455
See application file for complete search history.

(56) References Cited

U.S. PATENT DOCUMENTS

| | | | |
|---|---|---|---|
| 4,126,361 A | * | 11/1978 | Bottner et al. ................ 384/455 |
| 2010/0189386 A1 | | 7/2010 | Dizlek |
| 2011/0027086 A1 | | 2/2011 | Zeidlhack |

FOREIGN PATENT DOCUMENTS

| | | |
|---|---|---|
| BE | 662226 A | 8/1965 |
| DE | 1201128 B | 9/1965 |

(Continued)

OTHER PUBLICATIONS

Rothe Erde, "Drahtwalzlager", Sonderdruck aus der Technischen Rundschau Bern/Schweiz (1957), (Translation of p. 5, table 2 and p. 7 picture 8).

(Continued)

*Primary Examiner* — Phillip A Johnson
(74) *Attorney, Agent, or Firm* — Browdy and Neimark, PLLC (57) ABSTRACT

A rotary connection for a work machine, such as a crane, includes a rotational axis, an inner bearing ring, an outer bearing ring and at least three bearing body ring arrangements arranged between the bearing rings with a plurality of respective bearing bodies. At least one of the bearing body ring arrangements is configured to at least partially withstand forces directed in the radial direction to the rotational axis. At least two of the bearing body ring arrangements are configured to at least partially withstand forces directed parallel to the rotational axis and are arranged adjacent to and spaced apart from one another along the rotational axis. The at least two bearing body ring arrangements are configured to at least partially withstand forces directed parallel to the rotational axis in each case establish a direction of action and are arranged spaced apart from one another along the direction of action.

21 Claims, 4 Drawing Sheets

(51) Int. Cl.
*B66C 23/84* (2006.01)
*F16C 19/30* (2006.01)
*F16C 19/54* (2006.01)
*F16C 17/04* (2006.01)
*F16C 17/26* (2006.01)

(56) References Cited

FOREIGN PATENT DOCUMENTS

| | | |
|---|---|---|
| DE | 1202617 B | 10/1965 |
| DE | 3842464 A1 | 7/1989 |
| DE | 3942847 A1 | 6/1991 |
| DE | 202007002609 U1 | 4/2008 |
| DE | 102008062910 A1 | 6/2010 |
| DE | 102009035749 A1 | 2/2011 |
| DE | 102010052117 * | 5/2012 |
| EP | 1239171 A2 | 9/2002 |
| FR | 2072552 A5 * | 9/1971 |
| GB | 988169 A | 4/1965 |
| JP | 60222611 A | 11/1985 |
| JP | 6145496 U | 3/1986 |
| JP | 0165923 U | 4/1989 |
| JP | 06323329 | 11/1994 |
| JP | 2010534303 A | 11/2010 |
| WO | 2009012763 A2 | 1/2009 |
| WO | WO 2012098939 A1 * | 7/2012 |

OTHER PUBLICATIONS

Office Action, dated Aug. 29, 2014. Patent Application No. 2014-532377.

Office Action and English language translation in corresponding Japanese patent application No. 2014-532377.

* cited by examiner

Fig. 5

ROTARY CONNECTION FOR A WORK MACHINE

CROSS-REFERENCES TO RELATED APPLICATIONS

This application claims the priority of German Patent Application, Serial No. 10 2011 083 824.4, filed Sep. 30, 2011, pursuant to 35 U.S.C. 119(a)-(d), the content of which is incorporated herein by reference in its entirety as if fully set forth herein.

FIELD OF THE INVENTION

The invention relates to a rotary connection for a work machine, in particular for a crane.

BACKGROUND OF THE INVENTION

Rotary connections for work machines, such as, for example, cranes or diggers have been known for a long time, for example from DE 39 42 847 A1 and are used for the rotary connection, for example, of a crane undercarriage to a crane superstructure. Rotary connections of this type have two bearing rings and bearing bodies arranged in between. To increase the bearing capacity of the rotary connection, raceways in the form of hardened wire races are inserted into the bearing rings. Wire rolling bearings are known from "Rothe Erde, Drahtwälzlager", special edition from the technical "Rundschau" Bern/Switzerland, No. 18, 1957. The bearing bodies are configured there, in particular as balls, which are arranged on spring steel wires, which are placed on the bearing rings. Rotary connections of this type have a high static dynamic load rating, which may be between 25000 kN and 55000 kN, for example, for a load in the axial direction of a rotational axis and may be more than 5000 kN for a load in the radial direction of the rotational axis. This means that the main load is oriented along the rotational axis. The static dynamic load rating is also called the bearing capacity. In order to make such a large bearing capacity possible, large bearing bodies and large bearing rings are necessary in order to be able to withstand the loads to be borne. The diameter of a raceway, along which the bearing bodies are arranged, may be up to 5 m or more. The diameter of an individual bearing body may be 50 mm and more. Rotary connections of this type in particular have a large overall height so the work machines equipped therewith have a high space requirement. The overall size is taken to mean the outer dimensions of the rotary connection, in other words the outer diameter and the overall height. A large rotary connection is heavy and expensive. The production and, in particular, the assembly of wire rolling bearings is laborious and complicated. In particular, such bearings have to be produced without play. The adjustment and calibration of bearings of this type is time-consuming and expensive. Bearings of this type are used, in particular, for precision bearings. The outlay for setting and adjustment is large.

Further rotary connections are known, for example, from DE 10 2009 035 749 A1, EP 1 239 171 A2, GB 988,169, DE 12 02 617 A, DE 20 2007 002 609 U1 and DE 12 01 128 A. Bearings of this type, in particular, have a reduced static dynamic load rating. Rotary connections of this type are not suitable for use in work machines such as, for example, cranes or diggers.

SUMMARY OF THE

An object of the present invention is to provide a rotary connection for a work machine so that the rotary connection at a predetermined bearing capacity has a comparatively reduced overall size and, in particular a reduced overall height.

This object is achieved by a rotary connection for a work machine, in particular for a crane, with
 a. a rotational axis,
 b. an inner bearing ring,
 c. an outer bearing ring and
 d. at least three bearing body ring arrangements arranged between the bearing rings, each bearing body ring arrangement comprising a plurality of respective bearing bodies,
  wherein at least one of the bearing body ring arrangements is configured to at least partially withstand forces directed in the radial direction to the rotational axis,
  wherein at least two of the bearing body ring arrangements
   are configured to at least partially withstand forces directed parallel to the rotational axis,
   are arranged adjacent to one another along the rotational axis and
   are arranged spaced apart from one another along the rotational axis,
  wherein the at least two bearing body ring arrangements configured to at least partially withstand forces directed parallel to the rotational axis in each case establish a direction action and are arranged spaced apart from one another along the direction of action.

The use of at least two bearing body ring arrangements with, in each case, smaller bearing bodies, in other words, for example, cylindrical rollers with a reduced roller length and reduced roller diameter instead of a bearing body ring arrangement with very large bearing bodies, was recognised according to the invention. Thus, according to the invention, a single-row arrangement of bearing bodies is replaced by a multi-row, in particular two-row, and stepped arrangement of comparatively smaller bearing bodies. As a result, the force or load to be transmitted proportionately per bearing body and, in particular, the stresses occurring in the bearing rings, is reduced. It is thereby possible to reduce the overall height of the bearing rings, in other words the rotary connection as a whole. The stresses occurring in the bearing rings are directly proportional to the force to be transmitted and indirectly proportional to a surface to be passed over by the bearing bodies. The surface passed over corresponds to a projection of the bearing bodies onto a running surface, which is in each case arranged on a bearing ring. For example, rolling bodies such as cylindrical rollers can be used as bearing bodies. In this case, the surface passed over is produced as a product of the roller diameter, the roller length and the number of rollers arranged between an inner bearing ring and an outer bearing ring in a bearing body ring arrangement. A shear stress occurring in the bearing rings is not constant. A maximum shear stress does not occur at a running surface, on which the bearing bodies touch the bearing ring, but in the interior of the bearing ring. A spacing of the maximum shear stress from the running surface is directly proportional to the force to be transmitted and—in the case of cylindrical rollers as the bearing bodies—to the roller diameter. The spacing of the maximum shear stress from the running surface in the bearing ring is reduced by using smaller bearing bodies. The bearing ring may have a reduced height along the rotational axis, in particular in the region of the running surfaces. The loads on the bearing rings from shear stresses and bending moments depend on the load to be transmitted and the loaded cross-sectional faces of the bearing rings. The shear stresses and bending moments are locally different and, in particular, not constant. The loading conditions on the inner bearing ring and the outer bearing ring are complementary because of the action of force. A stepped arrangement of the bearing body ring arrangement therefore allows a particularly advantageous space-saving configuration of the bearing rings with a reduced overall height along the rotational axis. It is thus possible to arrange a plurality of bearing body ring arrangements between the inner bearing ring and the outer bearing ring in such a way that at least two of the bearing body ring arrangements are arranged adjacently and spaced apart from one another along the rotational axis of the rotary connection, in other words are stepped in multiple rows. The at least two bearing body ring arrangements in each case establish a direction of action, along which the rotary connection withstands the forces. In particular, the directions of action of the at least two bearing body ring arrangements are oriented parallel to one another. The at least two bearing body ring arrangements are arranged spaced apart from one another along the directions of action. In particular, the at least two bearing body ring arrangements are arranged stepped in multiple rows in a direction perpendicular to the direction of action. The direction of action is established by a bearing body rotational axis. The direction of action is oriented perpendicular to the centre face established by the bearing body rotational axes. This means that the centre faces of the bearing body ring arrangements are arranged stepped with respect to one another.

In particular, no further bearing body ring arrangement, which is used, for example, to at least partially withstand forces directed radially with respect to the rotational axis, is provided between the adjacent bearing body ring arrangements, which are used to at least partially withstand forces directed parallel to the rotational axis, in other words axial forces. The two adjacent bearing body ring arrangements are used to withstand forces directed in the same manner, in particular forces oriented in parallel, in other words to withstand tensile forces or compressive forces. These at least two bearing body ring arrangements replace one bearing body ring arrangement known from the prior art and lead to a reduction in the height of the bearing rings because of reduced loads occurring. It is possible for only one or a plurality of such stepped arrangements of bearing body ring arrangements to be provided on the rotary connection. The bearing body ring arrangements in each case have a centre face, which are, in particular, oriented parallel to one another. The centre face is defined by the arrangement of the bearing body rotational axes. Since the centre faces of the bearing body ring arrangements arranged in a stepped manner may be oriented parallel to one another, the latter allow the same type of force transmission between the bearing rings. A rotary connection of this type has a reduced weight and can, in particular, be produced economically because of the reduced material outlay. In total, at least three bearing body ring arrangements are provided. In addition to the reduction in the overall height as a result of the stepped arrangement of the bearing body ring arrangements, a reduction in the overall height of the rotary connection according to the invention is additionally produced from the use of smaller bearing bodies such as, for example, rolling bodies with a reduced roller diameter. As a result, the overall height of the rotary connection can additionally be reduced. A rotary connection of this type can transmit tensile and compressive forces along the rotational axis, transverse forces oriented perpendicularly or radially to the rotational axis and moments oriented perpendicularly to the rotational axis. Rotary connections of this type are, in particular, used in work machines, as, because of the loads to be transported, a high bearing capacity is necessary. This is, for example, the case in cranes and diggers. Rotary connections of this type are also called a roller rotary connection. However, it is also possible to use rotary connections of this type in wind wheels or other work machines, in which large forces act on the rotary connection.

A rotary connection comprising at least four bearing body ring arrangements, wherein the bearing body ring arrangement being used to at least partially withstand forces directed in the radial direction to the rotational axis is arranged along the rotational axis between at least one bearing body ring arrangement being used to at least partially withstand forces directed parallel to the rotational axis and two further bearing body ring arrangements arranged adjacently and spaced apart from one another and being used to at least partially withstand forces directed parallel to the rotational axis, allows a diversity of configuration in the design of the rotary connection. In particular it is possible for the stepped arrangement of the adjacent bearing body ring arrangements to be used to withstand tensile forces or compressive forces. The stepped arrangement of the adjacent bearing body ring arrangements may be provided along the rotational axis above or below the radial bearing body ring arrangement.

A rotary connection comprising at least four, in particular five, bearing body ring arrangements, which have two tensile bearing body ring arrangements and two compression bearing body ring arrangements, allows an additional reduction in the overall height of the rotary connection. Bearing body ring arrangements stepped in two rows are provided in each case both to withstand tensile forces and to withstand compressive forces. In particular it is possible to provide a fifth bearing body ring arrangement, which is configured, in particular, as a radial bearing body ring arrangement.

A rotary connection, in which the inner bearing ring has at least two inner bearing ring tensile running surfaces and at least two inner bearing ring compression running surfaces and the outer bearing ring has at least two outer bearing ring tensile running surfaces and at least two outer bearing ring compression running surfaces, wherein at least one bearing body ring arrangement is arranged between one of the inner bearing ring tensile running surfaces and one of the outer bearing ring tensile running surfaces or at least one bearing body ring arrangement is arranged between one of the inner bearing ring compression running surfaces and one of the outer bearing ring compression running surfaces, has an increased bearing capacity and, in particular, allows improved transmission of tensile and compressive forces, transverse forces and moments transverse to the rotational axis. The use of two respective bearing body ring arrangements between an inner bearing ring running surface and an outer bearing ring running surface allows a particularly effective configuration of the rotary connection, because it is space-saving, material-saving and cost-saving. Such stepped bearing rings are particularly robust and therefore mechanically loadable.

A rotary connection, in which the at least two bearing body ring arrangements arranged spaced apart along the rotational axis are arranged spaced apart in the radial direction with respect to the rotational axis, allows a compact arrangement of the bearing body ring arrangements between the bearing rings.

A rotary connection, in which one of the bearing rings, in particular the inner bearing ring, is configured in two parts, in particular with an inner bearing ring upper part and an inner bearing ring lower part, and has a dividing face, which is oriented transversely and in particular perpendicularly to the rotational axis, simplifies the assembly of the bearing rings with respect to the rotary connection. Depending on the attachment of the rotary connection to the work machine, either the inner bearing ring or the outer bearing ring can be configured to be divided.

A rotary connection, in which one of the bearing rings, in particular the outer bearing ring, has an inner step portion with a first height $h_1$ along the rotational axis and an outer step portion with a second height $h_2$ along the rotational axis, wherein there applies $h_1 < h_2$, allows a further reduction in the overall size of the rotary connection. Because of the configuration of one of the bearing rings, in particular the outer bearing ring, with an inner step portion and an outer step portion, which has an increased length along the rotational axis in relation to the inner step portion, the running surfaces in the tensile direction and in the compression direction are arranged stepped in relation to one another in each case. In addition, the running surfaces are arranged symmetrically, in particular with respect to a dividing face of the respective other bearing ring, in particular the inner bearing ring. As a result, it is possible for the stepped configuration, in particular of the outer bearing ring, both at the tensile running surfaces and at the compression running surfaces, to allow a further reduction in the overall size of the rotary connection. In particular, it is not necessary to compensate a reduced length of the outer bearing ring, for example at the tensile running surface, by an increased length of the inner bearing ring, as the step-like configuration of the outer bearing ring brings about a compensation of the forces to be withstood because of the flux of force. A rotary connection of this type has a load-optimised construction.

A rotary connection, in which at least two of the bearing body ring arrangements in each case have a centre face, which is oriented transversely, and in particular perpendicularly, to the rotational axis, allows an effective absorption of tensile and compressive forces along the rotational axis.

A rotary connection comprising rolling bodies as bearing bodies, in particular in the form of cylindrical rollers, tapered rollers, needles, barrels and/or balls, allows a particularly smooth rotary movement of the bearing rings in relation to one another. The rolling bodies required for this are available to an almost unlimited extent and allow production of the rotary connection with reduced costs. In particular, the bearing bodies are substantially cylindrical, in particular in the form of a cylindrical roller, a tapered roller, a needle or a barrel. This results in an enlarged running surface, in particular compared to a ball. In particular, it is therefore possible to increase the loadability of the bearing bodies and therefore of the rotary connection as a whole. In particular, the use of bearing wires for the wire rolling bearings to be expensively produced can be dispensed with.

A rotary connection comprising sliding bodies as bearing bodies, in particular in the form of sliding pairings and/or sliding paths, allows good sliding behaviour of the rotary connection. The overall height is additionally reduced.

A rotary connection, wherein running surfaces for the bearing bodies are configured in one piece on the bearing rings, is constructed in an uncomplicated manner. Since running surfaces for the bearing bodies are configured in one piece on the bearing rings, it is, in particular, unnecessary to arrange additional components such as, for example hardened bearing wires on the bearing rings or to integrate them, in particular, in the bearing ring. The running surfaces are, in particular, an integrated component of the bearing rings. The running surfaces characterise the portion of the bearing ring, in which the bearing bodies are arranged on the bearing ring.

A rotary connection, in which the bearing bodies are arranged directly on a corresponding running surface of the bearing rings, allows an uncomplicated structure of the rotary connection. In particular it is unnecessary to arrange additional elements between the bearing bodies and running surfaces of the bearing rings. The bearing bodies are arranged directly on a corresponding running surface of the bearing rings. The outlay to adjust and orient a rotary connection of this type is reduced.

Embodiments of the invention will be described in more detail below with the aid of the drawings

DESCRIPTION OF THE PREFERRED EMBODIMENTS

Figure 1:
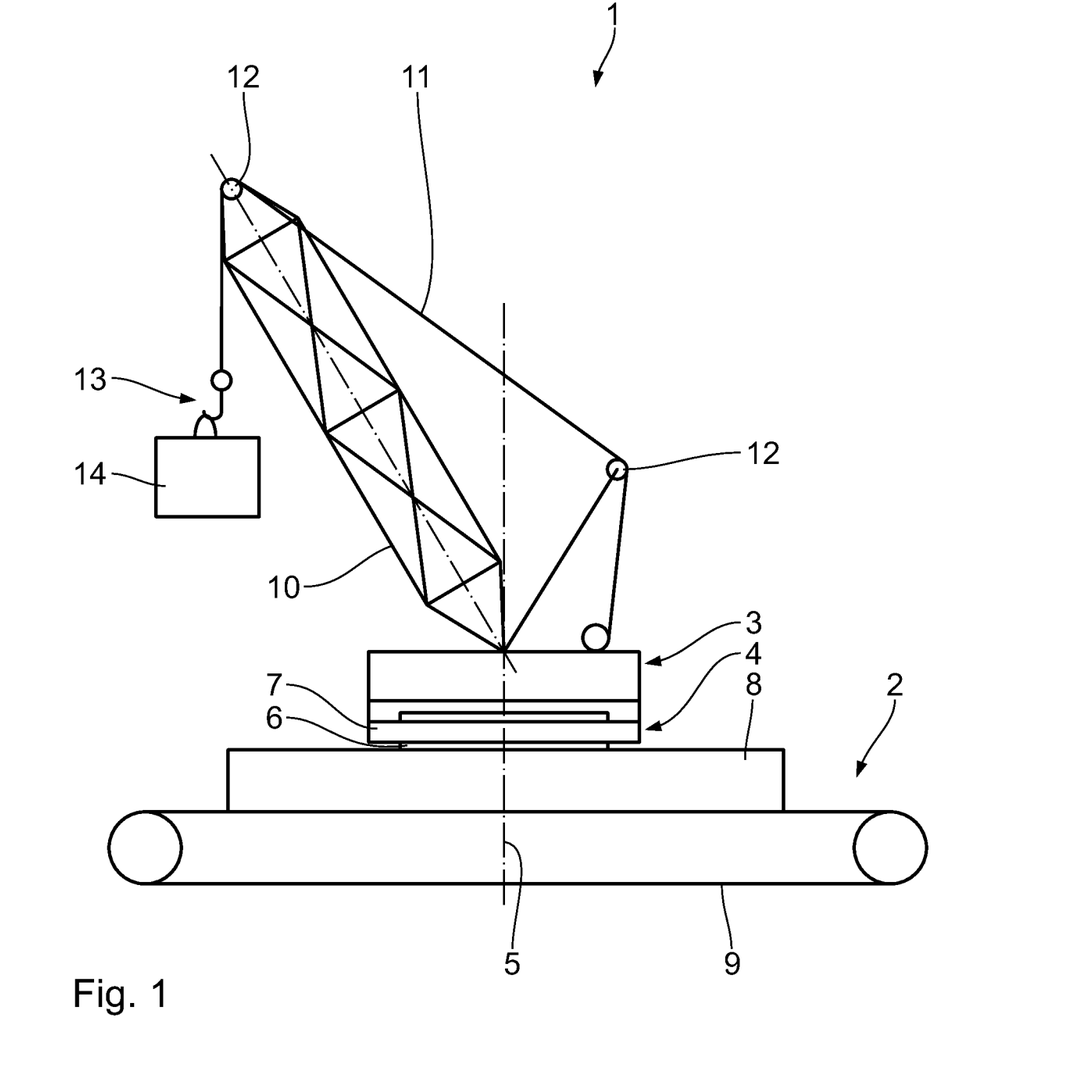
FIG. 1 shows a schematic view of a work machine with a rotary connection according to the invention.

A work machine shown schematically in FIG. 1 is a crane 1, which comprises an undercarriage 2 and a superstructure 3. The undercarriage 2 and the superstructure 3 are rotatably connected to one another by a rotary connection 4 with respect to a rotational axis 5. The rotational axis 5 is oriented vertically. This means that the rotational axis 5 is oriented perpendicularly to a base, on which the crane 1 is arranged. The rotary connection 4 has an inner bearing ring 6 and an outer bearing ring 7. The inner bearing ring 6 is connected to a centre part 8 of the undercarriage 2. The centre part 8 is supported on the base by means of a crawler chassis 9. It is possible to arrange a plurality of tyres or non-movable supports on the centre part 8 instead of the crawler chassis 9. The superstructure 3 is connected to the outer bearing ring 7 of the rotary connection 4. It is also possible for the outer bearing ring 7 to be connected to the undercarriage 2 and the inner bearing ring 6 to be connected to the superstructure 3. The superstructure 3 has a boom in the form of a lattice boom 10. The boom can also be configured as a telescopic boom. Furthermore, a load rope 11 is provided and is guided via the deflection rollers 12. A load hook 13 to receive a load 14 is provided at a free end of the load rope 11.

A rotary connection 4 according to the invention in accordance with a first embodiment will be described in more detail below with the aid of FIG. 2. The rotary connection 4 comprises an inner bearing ring 6 and an outer bearing ring 7, which are arranged concentrically with respect to the rotational axis 5. The inner bearing ring 6 is configured in two parts with an inner bearing ring upper part 15 and an inner bearing ring lower part 16, which are separated from one another by a dividing face 17. Since the inner bearing ring 6 is divided transversely, in particular perpendicularly to the rotational axis 5, the geometry of the inner bearing ring 6 can be adapted to the loads to be expected. In particular, it is possible to configure the stepped arrangement of the inner bearing ring 6 and its height along the rotational axis 5 to be suitable for the load. In particular, the width and height of the steps can be configured in such a way that a maximum shear stress to be expected is borne by the inner bearing ring 6 and, in particular, does not lead to damage thereto. The inner bearing ring 6 can also be configured in one part. The dividing face 17 runs substantially perpendicularly to the rotational axis 5, the dividing face 17 being able to have one or more steps in order to orient the inner bearing ring upper part 15 and the inner bearing ring lower part 16 in relation to one another with respect to the rotational axis 5. It is also possible for the dividing face 17 to be oriented transversely to the rotational axis 5.

The inner bearing ring upper part 15 and the inner bearing ring lower part 16 have a plurality of through-openings 18 that align with one another pairwise in each case and are used for inserting connection elements, not shown, such as, for example, screws or bolts. The inner bearing ring 6 is fastened to the undercarriage 2 by means of the connection elements.

The outer bearing ring 7 has a through-opening 19, which is oriented parallel to the rotational axis 5 and is used for fastening to the superstructure 3. Furthermore, the outer bearing ring 7 has an outer tooth system 20, by means of which the outer bearing ring can be rotatably driven with respect to the rotational axis 5 by means of a drive, not shown. The outer bearing ring 7 has an inner step portion 21 facing the rotational axis 5 with a first height $h_1$ along the rotational axis 5 and an outer step portion 22 with a second height $h_2$ along the rotational axis 5. The first height $h_1$ is smaller than the second height $h_2$. The inner bearing ring 6 encompasses the outer bearing ring 7 at least in the region of the step portions 21, 22. It is also possible to design the inner bearing ring 6 in such a way that further regions of the outer bearing ring 7 are surrounded.

A total of five bearing body ring arrangements 23 to 27 with, in each case, a plurality of identical bearing bodies 28 to 30 are provided between the inner bearing ring 6 and the outer bearing ring 7. The rotary connection is in five rows. The bearing body ring arrangement 25 is provided between a first, upper pair of adjacent bearing body ring arrangements 23, 24 arranged spaced apart along the rotational axis 5 and a second, lower pair of adjacent bearing body ring arrangements 26, 27 arranged spaced apart along the rotational axis 5. No further bearing body ring arrangement is provided between the respective adjacently arranged bearing body ring arrangements 23, 24 and 26, 27 of a pair.

The bearing body ring arrangement 25 is configured as a radial bearing body ring arrangement and arranged between an inner bearing ring radial running surface 31 of the inner bearing ring 6 and an outer bearing ring radial running surface 32 of the outer bearing ring 7. The radial running surfaces 31, 32 are in each case configured as cylindrical lateral surfaces and arranged concentrically with respect to the rotational axis 5. The radial bearing body ring arrangement 25 is used to withstand forces directed radially with respect to the rotational axis 5. The bearing bodies 29 are configured as cylindrical rollers. The bearing bodies 29 can also be configured as balls or in the form of other bearing bodies. The centre face of the bearing body ring arrangement 25 is configured as a cylinder lateral surface oriented concentrically with respect to the rotational axis 5.

The bearing body ring arrangements 23, 24 are in each case arranged between an inner bearing ring tensile running surface 33 of the inner bearing ring 6 and a respective outer bearing ring tensile running surface 34 of the outer bearing ring 7. The inner bearing ring tensile running surface 33 is an integral component of the inner bearing ring 6. The outer bearing ring tensile running surface 34 is an integral component of the outer bearing ring 7. In particular, the running surfaces 33, 34 are in each case configured in one piece with the corresponding bearing ring 6 or 7. The region or portion of the associated bearing ring 6 or 7, on which the bearing body ring arrangements 23, 24 are displaced, in particular rolled, are called the running surface 33, 34 in each case. The bearing bodies 28 of the bearing body ring arrangements 23, 24 are arranged directly on the respective corresponding running surface 33, 34. In particular, no further intermediate elements arranged between the bearing body 28 and the corresponding running surface 33, 34, such as wire races, are required.

The bearing bodies 28 of the tensile bearing body ring arrangements 23, 24 are configured identically and are used to withstand forces directed parallel to the rotational axis 5, in other words axially. The tensile bearing body ring arrangements 23, 24 are axial bearing arrangements. The tensile bearing body ring arrangements 23, 24 in each case have a centre face, the centre faces being oriented parallel to one another. The centre faces are established by the bearing body rotational axes 35, 36 of the bearing bodies 28. The bearing bodies 28 are configured as cylindrical rollers. The centre faces are correspondingly configured as ring faces arranged concentrically with respect to the rotational axis 5 and in each case oriented perpendicularly to the rotational axis 5.

The bearing body ring arrangements 23, 24 in each case have a direction 59 or 60 of action. The bearing body ring arrangements 23, 24 are suitable for withstanding forces along the respective direction 59, 60 of action. The directions 59, 60 of action are oriented perpendicularly to the respective centre face of the bearing body ring arrangements 23, 24. The directions 59, 60 of action are parallel to one another. The directions 59, 60 of action are oriented parallel to the rotational axis 5. The two bearing body ring arrangements 23, 24 arranged adjacent to one another are arranged spaced apart from one another along the directions 59, 60 of action. In a direction perpendicular to the directions 59, 60 of action, the two adjacently arranged bearing body ring arrangements 23, 24 are arranged stepped in multiple rows.

The tensile bearing body ring arrangement 23 is arranged on the outer step portion 22 and the tensile bearing body ring arrangement 24 is arranged on the inner step portion 21 of the outer bearing ring 7. The tensile bearing body ring arrangements 23, 24 are arranged spaced apart from one another along the rotational axis 5. The tensile bearing body ring arrangements 23, 24 are arranged spaced apart from one another in a radial direction 37 with respect to the rotational axis 5.

The bearing bodies 28 of the tensile bearing body ring arrangements 23, 24 in each case have a bearing body length along the radial direction 37 and a bearing body diameter in relation to the bearing body rotational axis 35 or 36. A bearing capacity characterising the rotary connection 4, i.e. a load that can be transmitted by the rotary connection 4, is directly proportional to the number of bearing bodies of a bearing body ring arrangement, the bearing body length and the bearing body diameter.

Figure 2:
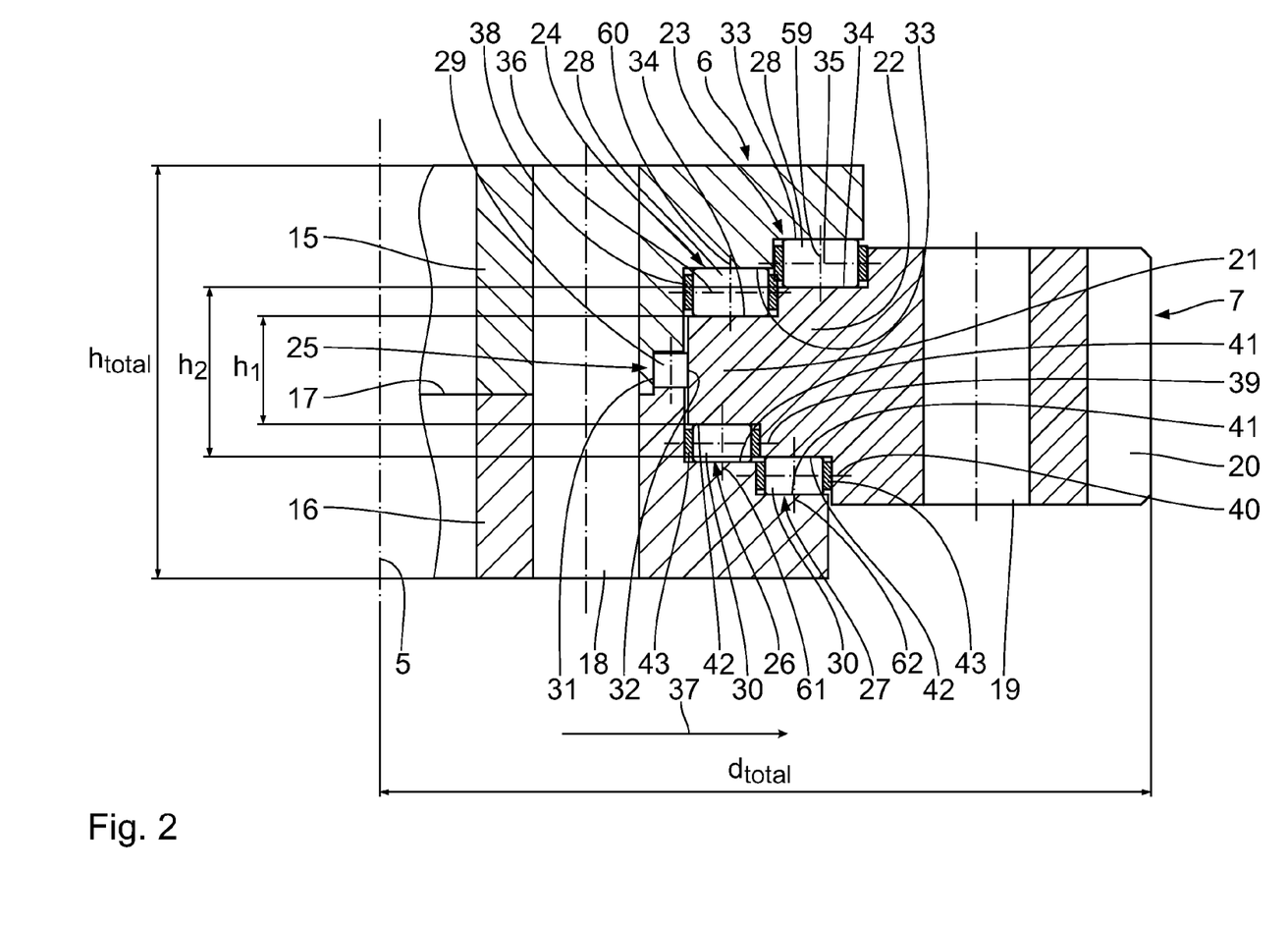
FIGS. 2 to 5 show enlarged longitudinal sections of a rotary connection according to various embodiments.

The face of the outer bearing ring 7, shown hatched in FIG. 2, which is a longitudinal section through the rotational axis 5, and in particular the height of the outer bearing ring 7 along the rotational axis 5, increases along the radial direction 37, in other words with an increasing radial spacing from the running surfaces 34, 42 as the shear stresses in the outer bearing ring 7 in the region of the through-opening 19 are greater because of the fastening to the superstructure 3 than in the region of the running surfaces 34, 42. This applies analogously to the inner bearing ring 6. Both the overall height of the inner bearing ring upper part 15 and that of the inner bearing ring lower part 16 increase with an increasing radial spacing from the running surfaces 33, 41, in other words counter to the radial direction 37, as the shear stresses in the inner bearing ring 6 are greater in the region of the through-opening 18 because of the fastening to the undercarriage 2 than in the region of the running surfaces 33, 41.

The bearing bodies 28 of the tensile bearing body ring arrangements 23, 24 are in each case connected to one another by means of a cage 38. The cage 38 increases the stability of the arrangement of the bearing bodies 28 in relation to one another. Analogously to the tensile bearing body ring arrangements 23, 24, a compression bearing body ring arrangement 26 is provided on the inner step potion 21 and a further compression bearing body ring arrangement 27 is provided on the outer step portion 22. The bearing bodies 30 of the compression bearing body ring arrangements 26, 27 are configured as cylinder rollers. In comparison to the bearing bodies 28 of the tensile bearing body ring arrangements 23, 24, the bearing bodies 30 have a reduced size, i.e. a reduced bearing body length along the radial direction 34 and a reduced bearing body diameter in relation to a respective bearing body rotational axis 39, 40. The bearing bodies 29, 30 can also be configured identically in order to reduce the number of various components during the production of the rotary connection 4. Correspondingly, the bearing body ring arrangements 26, 27 in each case have a direction 61 or 62 of action. The directions 61, 62 of action are in each case oriented perpendicularly to a centre face of the bearing body ring arrangements 26, 27. The directions 61, 62 of action are oriented parallel to one another. Along the directions 61, 62 of action, the bearing body ring arrangements 26, 27 are arranged spaced apart from one another. The bearing body ring arrangements 26, 27 arranged adjacent to one another are arranged stepped in a direction perpendicular to the directions 61, 62 of action. The directions 61, 62 of action are oriented parallel to the rotational axis 5.

The directions 59 to 62 of action are oriented parallel to one another and, in particular, to the rotational axis 5.

The compression bearing body ring arrangements 26, 27 are in each case arranged between an inner bearing ring compression running surface 41 and an outer bearing ring compression running surface 42 corresponding thereto.

The bearing bodies 30 of the compression bearing body ring arrangements 26, 27 are in each case connected to one another by means of a cage 43. The compression bearing body ring arrangements 26, 27 are arranged spaced apart from one another along the rotational axis 5 and spaced apart from one another along the radial direction 37.

The bearing bodies 28 and 30 are arranged on the outer bearing ring 7 on the opposing outer bearing ring tensile running surface 34 and outer bearing ring compression running surface 42 that are remote from one another.

Because of the respective offset and stepped arrangement of the bearing body ring arrangements 23, 24 or 26, 27, a total height $h_{total}$ of the rotary connection 4 can be reduced by more than 20%, the bearing capacity of the rotary connection being identical to that of a conventional rotary connection, which in each case has precisely one tensile bearing body ring arrangement and precisely one compression bearing body ring arrangement. Since the tensile bearing body ring arrangements 23, 24 or the compression bearing body ring arrangements 26, 27 are in each case arranged offset with respect to one another between the inner bearing ring 6 and the outer bearing ring 7, a total length of the two adjacent bearing body ring arrangements 23, 24 or 26, 27 corresponds to a length of a large, originally used bearing body. A total diameter $d_{total}$ is substantially unchanged in relation to a conventional rotary connection. A height of the outer bearing ring 7 can be reduced by more than 16% because of the reduced maximum shear stress. The rotary connection 4 has a reduced overall size and a reduced weight. The rotary connection 4 can, in particular, be produced in an uncomplicated manner with the manufacturing methods known today.

Figure 3:
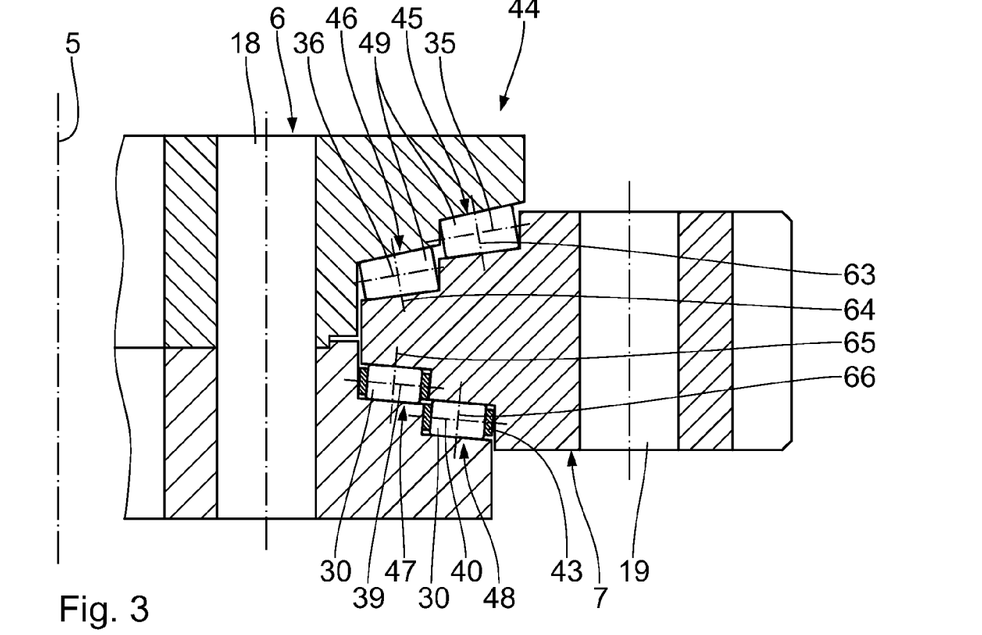

A further embodiment of a rotary connection 44 will be described below with the aid of FIG. 3. Components which correspond to those that have already been described above in relation to FIGS. 1 and 2 have the same reference numerals and will not be discussed again in detail.

The important difference of the rotary connection 44 according to the second embodiment is the arrangement and configuration of the tensile bearing body ring arrangements 45, 46 and the compression bearing body ring arrangements 47 and 48. The tensile bearing body ring arrangements 45, 46 in each case have bearing bodies 49 in the form of tapered rollers. The centre faces, which are defined by the bearing body rotational axes 35, 36, of the tensile bearing body ring arrangements 45, 46 are configured as tapered faces with respect to the rotational axis 5. Since the centre face of the tensile bearing body ring arrangements 45, 46 are inclined relative to the rotational axis 5, in other words are arranged transversely with respect to the rotational axis 5, the tensile bearing body ring arrangements 45, 46 are suitable to withstand forces oriented at least partially radially with respect to the rotational axis 5. Correspondingly, it is not necessary to provide a radial bearing body ring arrangement according to the first embodiment.

The tensile bearing body ring arrangements 45, 46 are configured without a cage. It is also possible to provide a cage for the ring arrangements 45, 46 to stabilise the bearing bodies 49.

The compression bearing body ring arrangements 47, 48 have cylindrical rollers 30 as the bearing bodies which are connected to one another by a cage 43. Unlike the first embodiment, the compression bearing body ring arrangements 47, 48 are arranged inclined relative to the rotational axis 5 in such a way that the centre faces formed by the bearing body rotational axes 39, 40 are configured as tapered lateral surfaces. The centre faces of the compression bearing ring arrangements 47, 48 are arranged spaced apart from one another in parallel and along the rotational axis 5. The compression bearing body ring arrangements 47, 48 are suitable because of their oblique arrangement with respect to the rotational axis 5 to at least partially withstand forces in the radial direction 37.

The bearing body ring arrangements 45, 46 have directions 63 or 64 of action which are inclined in accordance with their centre faces. The bearing body ring arrangements 47, 48 have directions 65 or 66 of action inclining accordingly. The directions 63, 64 of action are parallel to one another. The directions 65, 66 of action are parallel to one another. The direction of action pairs 63, 64 and 65, 66 are not parallel to one another and, in particular, inclined relative to the rotational axis 5. An angle of inclination of the directions 63, 64 of action with the rotational axis 5 or of the directions 65, 66 of action with the rotational axis 5 is substantially identical in terms of amount but has different signs. For example, an angle of inclination between the directions 63, 64 of action and the rotational axis may be about +5° and an angle of inclination between the directions 65, 66 of action and the rotational angle 5 may be about −5°. It is also possible for the two angles of inclination to be different in terms of amount. In a direction perpendicular to the directions 63, 64 or 65, 66 of action, the respective bearing body ring arrangements 45, 46 or 47, 48 arranged adjacent to one another are arranged in a stepped manner Along their directions 63, 64 of action, the bearing body ring arrangements 45, 46 are arranged spaced apart from one another. This applies equally to the bearing body ring arrangements 47, 48 along the directions 65, 66 of action.

Figure 4:
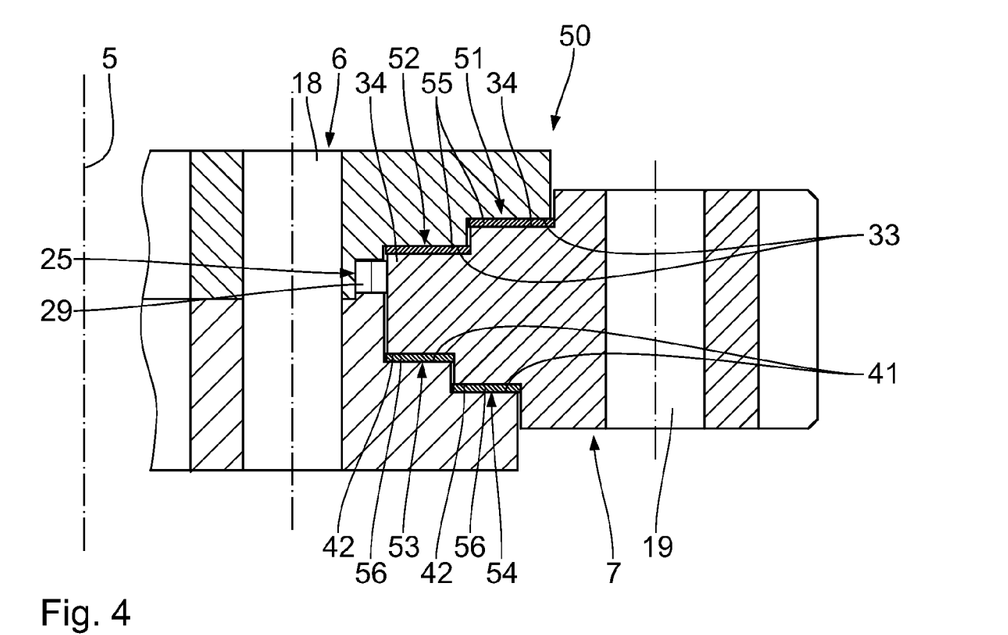

A third embodiment of a rotary connection 50 is described below with the aid of FIG. 4. Components corresponding to those which have already been described above with reference to FIGS. 1 to 3 have the same reference numerals and will not be discussed again in detail.

In the rotary connection 50, tensile bearing body ring arrangements 51, 52 and the compression bearing body ring arrangements 53, 54 are configured with sliding bodies 55 and 56 as bearing bodies. The sliding bodies 55 of the tensile bearing body ring arrangements 51, 52 are in the form of a ring disc with different inner and outer diameters. The ring discs 55 in each case have an identical length with respect to the radial direction 37. It is possible to produce the ring discs 55 or 56, for example, from a single ring disc, so that, for example, the outer diameter of the ring disc 55 arranged on the inside corresponds to the internal diameter of the ring disc arranged on the outside.

Analogously, the sliding bodies 56 are configured as ring discs with identical lengths with respect to the radial direction 37. The sliding bodies 55, 56 are, for example, produced from brass or another material with good sliding properties. The tensile bearing body ring arrangements 51, 52 and the compression bearing body ring arrangements 53, 54 are in each case oriented perpendicularly to the rotational axis 5. Accordingly, a radial bearing body ring arrangement 25 is provided to withstand forces oriented along the radial direction 37.

The sliding bodies 55, 56 have, with respect to the bearing bodies 28, 30 according to the first embodiment, a reduced height along the rotational axis 5. The rotary connection 50 according to the third embodiment allows a further reduction in the overall size. The sliding bodies 55, 56 are provided between the inner bearing ring 6 and the outer bearing ring 7 as separate components. Alternatively, it is possible to coat the inner bearing ring tensile running surface 33, the outer bearing ring tensile running surface 34, the inner bearing ring compression running surface 41 and the outer bearing ring compression running surface 42 with a sliding material in such a way that the running surfaces 33, 34, 41, 42 are used as sliding paths. As a result, the number of parts of the rotary connection 50 is further reduced. In particular, the overall size can also be additionally reduced with a coating of the running surfaces 33, 34, 41, 42.

Because of the arrangement of the bearing body ring arrangements 51, 52, 53, 54 analogously to the arrangement of the bearing body ring arrangements 23, 24, 26, 27 according to the first embodiment in FIG. 2, the bearing body ring arrangements 51 to 54 have identical directions of action.

Figure 5:
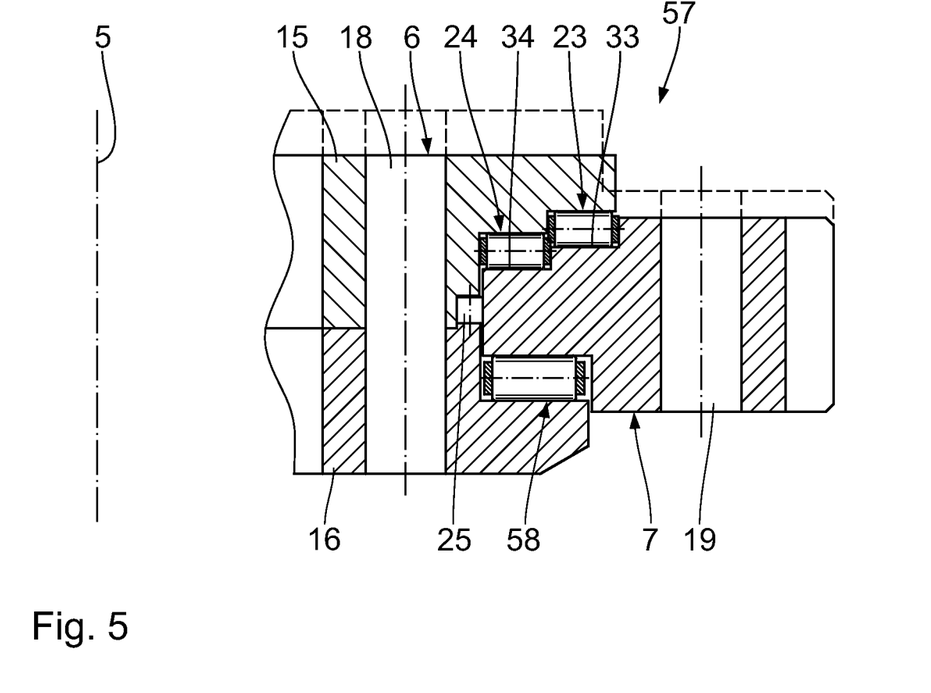

A further embodiment of a rotary connection 57 is described below with the aid of FIG. 5. Components corresponding to those which have already been described above with reference to FIGS. 1 to 4 have the same reference numerals and will not be discussed again in detail.

In contrast to the rotary connection 4 according to the first embodiment, the rotary connection 57 according to the fourth embodiment has precisely one stepped arrangement of bearing body ring arrangements 23, 24. Bearing body ring arrangements 23, 24 are arranged between the inner bearing ring upper part 15 and the outer bearing ring 7 on the running surfaces 33, 34. The rotary connection 57 is in four rows.

Precisely one bearing body ring arrangement 58 and, in particular, not a stepped arrangement of a plurality of bearing body ring arrangements, is provided between the inner bearing ring lower part 16 and the outer bearing ring 7. The rotary connection 57 has in total 4 bearing body ring arrangements 23, 24, 25, 58.

This means that in the rotary connection 57, only the inner bearing ring upper part 15 is stepped, in other words is configured to receive two corresponding bearing body ring arrangements 23, 24. Accordingly, the outer bearing ring 7 is also stepped on an upper side facing the inner bearing ring upper part 15. The inner bearing ring lower part 16 and a lower side of the outer bearing ring 7 facing the inner bearing ring lower part 16 are configured conventionally, in other words unstepped, to receive a single bearing body ring arrangement 58. It is possible to adopt the inner bearing ring lower part 16, for example, from an existing rotary connection or at least to configure it in the same manner, so the number of parts for the rotary connection 57 is reduced. As a result, an additional cost advantage is produced.

The bearing body ring arrangements 23, 24 have identical directions of action to the bearing body ring arrangements 23, 24 in the embodiment according to FIG. 2.

The invention claimed is:

1. A rotary connection for a work machine, with
    a. a rotational axis,
    b. an inner bearing ring,
    c. an outer bearing ring, and
    d. at least three bearing body ring arrangements arranged between the inner bearing ring and the outer bearing ring, each bearing body ring arrangement comprising a plurality of respective bearing bodies,
    wherein at least one of the bearing body ring arrangements is configured to withstand forces directed in the radial direction to the rotational axis,
    wherein at least two of the bearing body ring arrangements are configured to withstand forces directed parallel to the rotational axis,
    wherein said at least two bearing body ring arrangements are arranged adjacent to one another along the rotational axis such that no further bearing body ring arrangement is provided between said at least two bearing body ring arrangements, and
    wherein said at least two bearing body ring arrangements are arranged spaced apart from one another along the rotational axis such that said at least two bearing body ring arrangements are in a stepped arrangement, and
    wherein the at least two bearing body ring arrangements configured to at least partially withstand forces directed parallel to the rotational axis in each case establish a direction of action and are arranged spaced apart from one another along the direction of action.

2. The rotary connection according to claim 1, comprising at least four bearing body ring arrangements, wherein the bearing body ring arrangement being used to at least partially withstand forces directed in the radial direction to the rotational axis is arranged along the rotational axis between at least one bearing body ring arrangement being used to at least partially withstand forces directed parallel to the rotational axis and two further bearing body ring arrangements arranged adjacently and spaced apart from one another and being used to at least partially withstand forces directed parallel to the rotational axis.

3. The rotary connection according to claim 1, further comprising at least four, bearing body ring arrangements, which have two tensile bearing body ring arrangements and two compression bearing body ring arrangements.

4. The rotary connection according to claim 1, wherein the inner bearing ring has at least two inner bearing ring tensile running surfaces and at least two inner bearing ring compression running surfaces and the outer bearing ring has at least two outer bearing ring tensile running surfaces and at least two outer bearing ring compression running surfaces, wherein one of at least one bearing body ring arrangement is arranged between one of the inner bearing ring tensile running surfaces and one of the outer bearing ring tensile running surfaces and at least one bearing body ring arrangement is arranged between one of the inner bearing ring compression running surfaces and one of the outer bearing ring compression running surfaces.

5. The rotary connection according to claim 1, wherein the at least two bearing body ring arrangements arranged spaced apart along the rotational axis are arranged spaced apart in the radial direction with respect to the rotational axis.

6. The rotary connection according to claim 1, wherein one of the bearing rings is configured in two parts, and has a dividing face, which is oriented perpendicularly to the rotational axis.

7. The rotary connection according to claim 6, wherein the inner bearing ring of the bearing rings is configured in two parts and has a dividing face, which is oriented transversely to the rotational axis.

8. The rotary connection according to claim 6, wherein the two parts of one of the bearing rings are comprised of an inner bearing ring upper part and an inner bearing ring lower part.

9. The rotary connection according to claim 6, wherein the dividing face is oriented perpendicularly to the rotational axis.

10. The rotary connection according to claim 1, wherein at least two of the bearing body ring arrangements in each case have a centre face, which is oriented transversely to the rotational axis.

11. The rotary connection according to claim 1, further comprising rolling bodies as the bearing bodies.

12. The rotary connection according to claim 1, further comprising sliding bodies as the bearing bodies.

13. The rotary connection according to claim 1, wherein the work machine is a crane.

14. The rotary connection according to claim 1, further comprising at least five bearing body ring arrangements, which have two tensile bearing body ring arrangements and two compression bearing body ring arrangements.

15. The rotary connection according to claim 1, wherein the outer bearing ring has an inner step portion with a first height along the rotational axis and an outer step portion with a second height along the rotational axis, wherein the first height is less than the second height.

16. The rotary connection according to claim 1, wherein at least two of the bearing body ring arrangements in each case have a centre face, which is oriented perpendicularly to the rotational axis.

17. The rotary connection according to claim 1, further comprising rolling bodies as the bearing bodies in the form of at least one of the group of cylindrical rollers, tapered rollers, needles, barrels and balls.

18. The rotary connection according to claim 1, further comprising sliding bodies as the bearing bodies in the form of at least one of sliding pairings and sliding paths.

19. A rotary connection for a work machine with
   a. a rotational axis,
   b. an inner bearing ring,
   c. an outer bearing ring, and
   d. at least three bearing body ring arrangements arranged between the inner bearing ring and the outer bearing ring, each bearing body ring arrangement comprising a plurality of respective bearing bodies,
   wherein at least one of the bearing body ring arrangements is configured to withstand forces directed in the radial direction to the rotational axis,
   wherein at least two of the bearing body ring arrangements are configured to withstand forces directed parallel to the rotational axis,
   wherein said at least two bearing body ring arrangements are arranged adjacent to one another along the rotational axis such that no further bearing body ring arrangement is provided between said at least two bearing body ring arrangements, and
   wherein said at least two bearing body ring arrangements are arranged spaced apart from one another along the rotational axis such that said at least two bearing body ring arrangements are in a stepped arrangement,
   wherein the at least two bearing body ring arrangements configured to at least partially withstand forces directed parallel to the rotational axis in each case establish a direction of action and are arranged spaced apart from one another along the direction of action,
   wherein one of the bearing rings has an inner step portion with a first height along the rotational axis and an outer step portion with a second height along the rotational axis,
   wherein the first height is less than the second height,
   wherein in each plane oriented perpendicular to the rotational axis the inner bearing ring is arranged between the rotational axis and the outer bearing ring, and
   wherein in said perpendicular plane the outer diameter of the inner bearing ring is smaller than the outer diameter of the outer bearing ring.

20. A rotary connection for a work machine with
   a. a rotational axis,
   b. an inner bearing ring,
   c. an outer bearing ring, and
   d. at least three bearing body ring arrangements arranged between the inner bearing ring and the outer bearing ring, each bearing body ring arrangement comprising a plurality of respective bearing bodies,
   wherein at least one of the bearing body ring arrangements is configured to withstand forces directed in the radial direction to the rotational axis,
   wherein at least two of the bearing body ring arrangements are configured to withstand forces directed parallel to the rotational axis,
   wherein said at least two bearing body ring arrangements are arranged adjacent to one another along the rotational axis such that no further bearing body ring arrangement is provided between said at least two bearing body ring arrangements, and
   wherein said at least two bearing body ring arrangements are arranged spaced apart from one another along the rotational axis such that said at least two bearing body ring arrangements are in a stepped arrangement,
   wherein the at least two bearing body ring arrangements configured to at least partially withstand forces directed parallel to the rotational axis in each case establish a direction of action and are arranged spaced apart from one another along the direction of action, and
   wherein running surfaces for the bearing bodies are configured in one piece on the bearing rings.

21. The rotary connection according to claim 20, wherein the bearing bodies are arranged directly on a corresponding running surface of the bearing rings.

* * * * *